United States Patent
Sawai et al.

(10) Patent No.: US 10,728,414 B2
(45) Date of Patent: Jul. 28, 2020

(54) DETECTION APPARATUS, CONTROL METHOD, AND STORAGE MEDIUM

(71) Applicant: CANON KABUSHIKI KAISHA, Tokyo (JP)

(72) Inventors: Yuki Sawai, Yokohama (JP); Megumi Maruyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/575,268

(22) Filed: Sep. 18, 2019

(65) Prior Publication Data

US 2020/0106914 A1    Apr. 2, 2020

(30) Foreign Application Priority Data

Oct. 2, 2018    (JP) .................................. 2018-187760

(51) Int. Cl.
| | |
|---|---|
| G03G 15/00 | (2006.01) |
| B65H 37/00 | (2006.01) |
| H04N 1/195 | (2006.01) |
| B41J 29/19 | (2006.01) |
| H04N 1/028 | (2006.01) |

(52) U.S. Cl.
CPC .......... *H04N 1/19531* (2013.01); *B41J 29/19* (2013.01); *H04N 1/0285* (2013.01)

(58) Field of Classification Search
CPC ............. H04N 1/19531; H04N 1/0285; H04N 1/02825; H04N 1/00477; H04N 1/00909; B41J 29/19

USPC ............... 358/3.26, 1.12, 475; 399/9, 11, 23
See application file for complete search history.

(56) References Cited

U.S. PATENT DOCUMENTS

| | | | | |
|---|---|---|---|---|
| 4,785,295 | A * | 11/1988 | Fukui ........................ | B65H 7/14 340/679 |
| 6,153,888 | A * | 11/2000 | Fournier ................ | B65H 7/125 250/205 |
| 6,704,523 | B2 * | 3/2004 | Takeuchi ................. | B65H 7/14 250/559.4 |
| 9,804,548 | B2 * | 10/2017 | Kato ....................... | B65H 20/02 |
| 2003/0007054 | A1 * | 1/2003 | Namiki ................... | G03G 15/65 347/101 |
| 2003/0021608 | A1 * | 1/2003 | Morita ............... | G03G 15/6502 399/23 |
| 2003/0031476 | A1 * | 2/2003 | Takeuchi ................. | B65H 7/14 399/16 |

FOREIGN PATENT DOCUMENTS

JP    9-240885 A    9/1997

* cited by examiner

*Primary Examiner* — Cheukfan Lee
(74) *Attorney, Agent, or Firm* — Canon U.S.A., Inc. IP Division

(57) ABSTRACT

A detection apparatus includes a second detection unit configured to detect lowering of a light reflectance of a reflection portion based on an output value based on light received by a light receiving portion while an object is moving on a conveyance path, without depending on at least a part of output values output based on light received by the receiving unit while the object is stopped on the conveyance path.

17 Claims, 8 Drawing Sheets

DETECTION APPARATUS, CONTROL METHOD, AND STORAGE MEDIUM

BACKGROUND

Field of the Disclosure

The present disclosure relates to a detection apparatus, a control method, and a storage medium.

Description of the Related Art

Conventionally, an optical detection apparatus for detecting a presence or absence of an object or the position of an object has been known (see Japanese Patent Application Laid-Open No. 9-240885). An optical detection apparatus detects an object by a light receiving element receiving light. This light is emitted from a light emitting element and reflected by a reflection unit, such as a reflection plate, or an object to be detected. Further, it is known that an optical detection apparatus is used for controlling conveyance of a recording medium in a print recording apparatus.

In a conventional method, when a light reflectance of a reflection unit is deteriorated because of contamination adhered thereto, an amount of light reflected by the reflection unit is reduced, so that erroneous detection of an object can occur. Under such a condition where the light reflectance of the reflection unit is deteriorated, for example, processing for notifying a user of the error or processing for cleaning the reflection plate needs to be executed. Regardless of which processing to be executed, it may be necessary to detect deterioration of the light reflectance of the reflection unit. As the optical detection apparatuses have been widely used, there has been an increased demand for a technique for appropriately detecting deterioration of the light reflectance of the reflection unit.

SUMMARY

Therefore, various embodiments are directed to or implement a technique for appropriately detecting deterioration of the light reflectance of the reflection unit.

According to an aspect of some embodiments, a detection apparatus which includes a conveyance portion configured to convey an object via a conveyance path and discharge the object to a discharge portion, a reflection portion configured to reflect light, a light emitting portion configured to emit light in a direction where the reflection portion is positioned, and a light receiving portion configured to receive light from outside including light reflected from the reflection portion includes an acquisition unit configured to acquire an output value based on the light received by the light receiving portion, a first detection unit configured to detect, based on the output value, the object conveyed and passing through at least a part of a path of light through which light emitted by the light emitting portion passes after the light emitted by the light emitting portion is reflected by the reflection portion until the reflected light is received by the light receiving portion, and a second detection unit configured to detect lowering of a light reflectance of the reflection portion based on the output value output based on light received by the light receiving portion while the object is moving on a conveyance path, not based on at least a part of output values output based on light received by the receiving unit while the object is stopped on the conveyance path.

Further features of various embodiments will become apparent from the following description of exemplary embodiments with reference to the attached drawings.

DESCRIPTION OF THE EMBODIMENTS

A detection apparatus according to a first exemplary embodiment will be described. In the present exemplary embodiment, a recording apparatus that detects a recording medium used for printing based on reflection light from a reflection plate will be described as an example of the detection apparatus. However, the present exemplary embodiment is not limited thereto. The detection apparatus according to the present invention is applicable to various apparatuses which execute the processing based on reflection light from a reflection plate. Specifically, for example, some embodiments are applied to an apparatus which detects objects other than a recording medium based on reflection light from the reflection plate. Further, for example, if the detection apparatus serves as a printer (image forming apparatus), the some embodiments are applicable to an ink jet printer that uses ink as a recording agent, a full-color laser beam printer or a monochromatic printer that uses toner as a recording agent.

Figure 1:
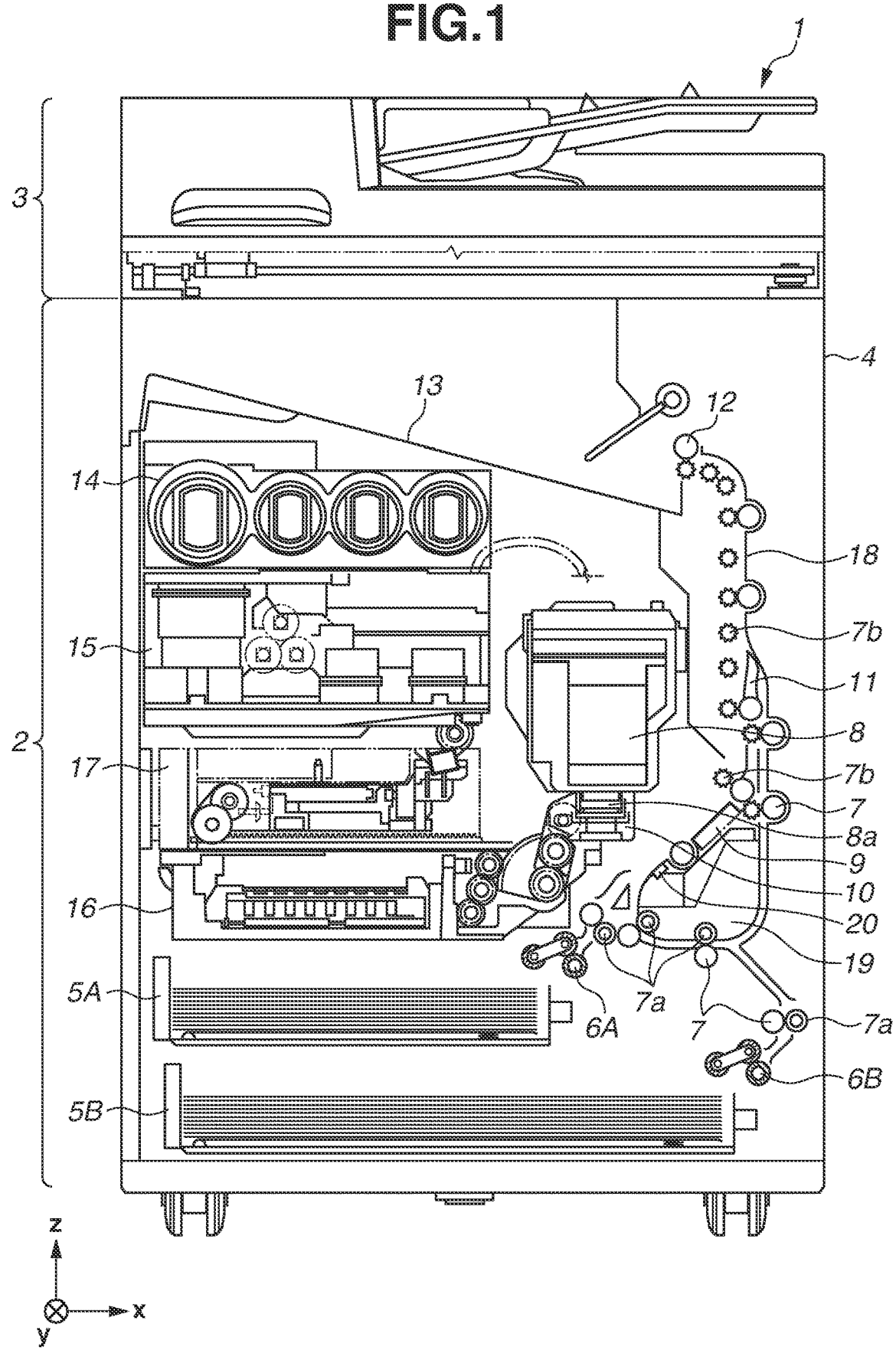
FIG. 1 is a diagram illustrating a state where a recording apparatus is in a stand-by state.

FIG. 1 is a diagram illustrating an internal configuration of an ink jet recording apparatus 1 (hereinafter, "recording apparatus 1") described in the present exemplary embodiment. In FIG. 1, an x-direction represents a horizontal direction, a y-direction (i.e., direction perpendicular to a sheet face) represents a direction in which discharge ports are arrayed on a recording head 8 described below, and a z-direction represents a vertical direction.

The recording apparatus 1 is a multifunction peripheral having a printing unit 2 and a scanner unit 3, and various types of processing relating to recording operation and reading operation can be individually or cooperatively executed by the printing unit 2 and the scanner unit 3. The scanner unit 3 includes an auto-document feeder (ADF) and a flatbed scanner (FBS). The scanner unit 3 can read (scan) a document automatically fed by the ADF and a document placed on a document positioning plate of the FBS by the user. In the present exemplary embodiment, although the multifunction peripheral including both of the printing unit 2 and the scanner unit 3 will be described, the present exemplary embodiment is also applicable to a multifunction peripheral without having the scanner unit 3. FIG. 1 illustrates a state where the recording apparatus 1 is in a stand-by state where neither the recording operation nor the reading operation is executed.

In the printing unit 2, a first cassette 5A and a second cassette 5B for storing recording media (cut sheets) S are removably arranged on a lower bottom portion in the vertical direction of a housing 4. Recording media having a relatively small size of up to an A4 size and recording media having a relatively large size of up to an A3 size are uniformly stacked on and stored in the first cassette 5A and the second cassette 5B respectively. A first feeding unit 6A for separating and feeding the stored recording media one by one is arranged in a vicinity of the first cassette 5A. Similarly, a second feeding unit 6B is arranged in a vicinity of the second cassette 5B. When recording operation is executed, a recording medium S is selectively fed from any one of the cassettes 5A and 5B.

A conveyance roller 7, a discharge roller 12, a pinch roller 7a, a spur roller 7b, a guide 18, an inner guide 19, and a flapper 11 constitute a conveyance mechanism for guiding the recording medium S in a predetermined direction. The conveyance roller 7 is a driving roller which is arranged on the upstream side of the recording head 8 and driven by a conveyance motor (not illustrated). The pinch roller 7a is a driven roller that nips the recording medium S and rotates together with the conveyance roller 7. The discharge roller 12 is a drive roller which is arranged on the downstream side of the recording head 8 and driven by a conveyance motor (not illustrated). The spur roller 7b nips and conveys the recording medium S together with the discharge roller 12.

The guide 18 is arranged on the conveyance path of the recording medium S and guides the recording medium S in a predetermined direction. The inner guide 19 is a member having a curved side face and extending in the y-direction to guide the recording medium S along the side face. The flapper 11 is a member for changing a conveyance direction of the recording medium S when a two-sided recording operation is to be executed. A discharge tray 13 is used for stacking and holding the recording medium S discharged by the discharge roller after recording operation is completed.

A sheet detection sensor 20 includes a light emitting element and a light receiving element according to the present invention. A reflection plate (reflection mirror) serving as a reflection portion (not illustrated) is arranged at a position opposite to the sheet detection sensor 20 with a conveyance path therebetween. The light emitting element emits light in a direction where the reflection plate is positioned. Then, the reflection plate reflects light emitted from the light emitting element using a reflection mirror. The light receiving element receives external light including the light reflected by the reflection plate. The light receiving element receives external light including light reflected from the recording medium S while the recording medium S is passing through a position opposite to the sheet detection sensor 20. By using the above-described constituent elements, the sheet detection sensor 20 identifies the output value (output data) that is output based on light from the external portion and detects the object (recording medium). Specifically, the sheet detection sensor 20 detects the object passing through at least a part of the path of light reflected from the reflection plate and then received by the light receiving element, based on the output value that is output based on light that the light receiving element receives in a state where the object is passing through at least a part of the path. The sheet detection sensor 20 can detect a position of the leading edge or the trailing edge of the recording medium S by detecting a presence or absence of the recording medium S as described above and has a conveyance control function for monitoring the conveyance state of the recording medium S. Specifically, based on a detection result of the recording medium S acquired by the sheet detection sensor 20, a timing for starting a recording operation of the recording head 8 is controlled. Further, in a case where the recording medium S is not detected by the sheet detection sensor 20, the user is notified of an error, such as paper jam. In other words, the output value acquired by the sheet detection sensor 20 is also used for executing error detection. In addition, more than one sheet detection sensor 20 may be arranged at positions other than the illustrated position on the conveyance path.

The recording head 8 according to the present exemplary embodiment is a full-line type color ink-jet recording head, in which discharge ports for discharging ink according to recording data are arranged in rows corresponding to the width of the recording medium S in the y-direction in FIG. 1. When the recording head 8 is placed at a stand-by position, a discharge port face 8a of the recording head 8 is capped with a cap unit 10 as illustrated in FIG. 1. When recording operation is to be executed, orientation of the recording head 8 is changed by a print controller 202 described below, so that the discharge port face 8a is positioned opposite to a platen 9. The platen 9 is configured of a flat plate extending in the y-direction, and supports the recording medium S on a back face thereof when a recording operation is executed by the recording head 8. The movement of the recording head 8 from the stand-by position to the recording position will be described below in detail.

An ink tank unit 14 retains four colors of ink supplied to the recording head 8. An ink supply unit 15 is arranged on a flow path that connects the ink tank unit 14 and the recording head 8, so that a pressure and a flow rate of the ink within the recording head 8 are each adjusted in an appropriate range. A circulation-type ink supply system is employed in the present exemplary embodiment, so that the ink supply unit 15 adjusts each of a pressure of ink supplied to the recording head 8 and a flow rate of ink collected from the recording head 8 in an appropriate range.

A maintenance unit 16 includes a cap unit 10 and a wiping unit 17, and activates the cap unit 10 and the wiping unit 17 at a predetermined timing to execute a maintenance operation with respect to the recording head 8. The maintenance operation will be described below in detail.

Figure 2:
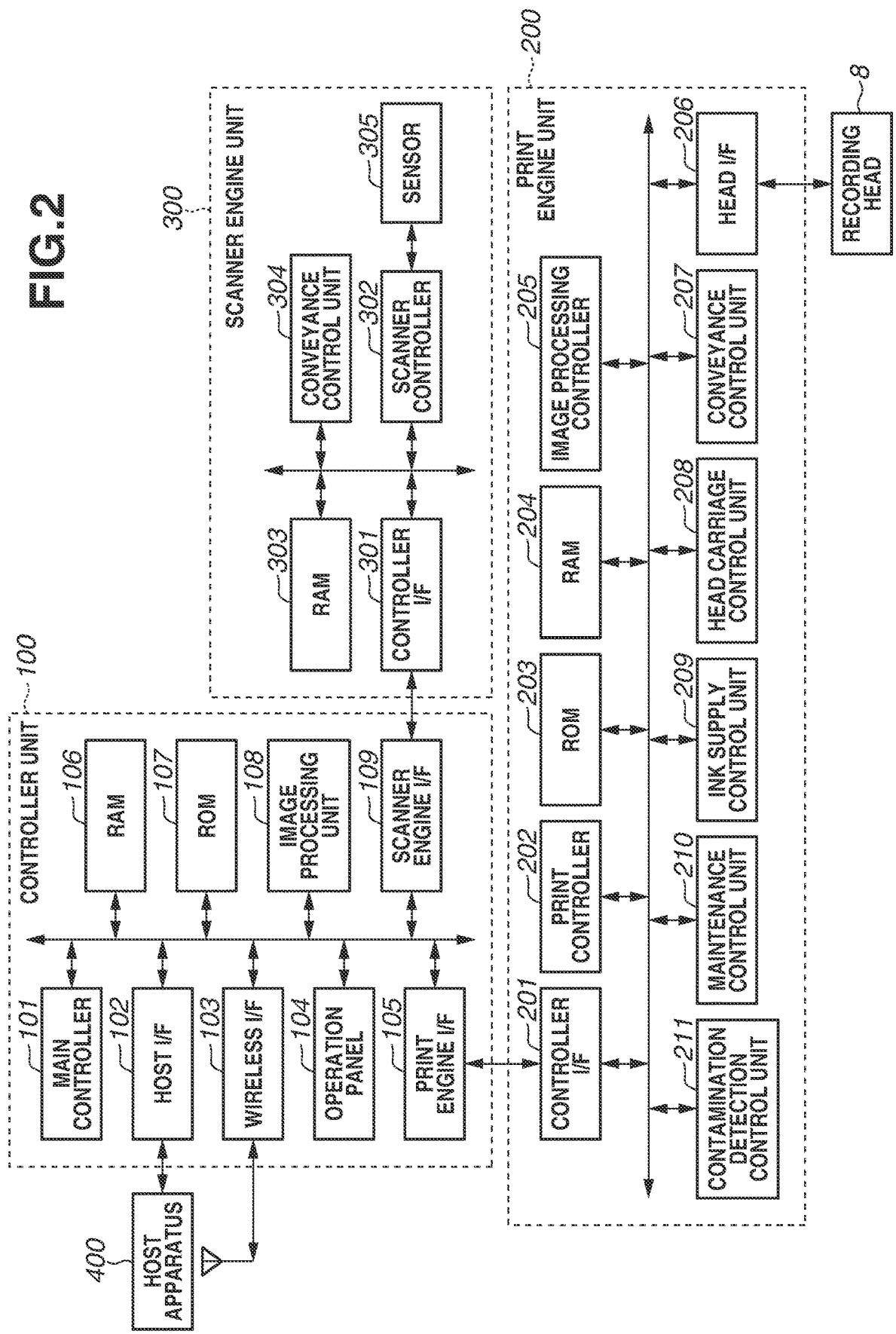
FIG. 2 is a block diagram illustrating a control structure of the recording apparatus.

FIG. 2 is a block diagram illustrating a control structure of the recording apparatus 1. The control structure is mainly configured of a print engine unit 200 for controlling the printing unit 2, a scanner engine unit 300 for controlling the scanner unit 3, and a controller unit 100 for controlling the entirety of the recording apparatus 1. A print controller 202 controls various mechanisms of the print engine unit 200 based on an instruction from a main controller 101 of the controller unit 100. Various mechanisms of the scanner engine unit 300 are controlled by the main controller 101 of the controller unit 100. The control structure will be described below in detail.

The main controller 101 configured of a central processing unit (CPU), included in the controller unit 100, uses a random access memory (RAM) 106 as a work area to control the entirety of the recording apparatus 1 according to a program or various parameters stored in a read only memory (ROM) 107. For example, when a print job is received from a host apparatus 400 via a host interface (I/F) 102 or a wireless I/F 103, predetermined image processing is executed on image data received by an image processing unit 108 based on an instruction from the main controller 101. Then, the main controller 101 transmits the image data on which the image processing is executed to the print engine unit 200 via a print engine 105.

In addition, the recording apparatus 1 may acquire image data from the host apparatus 400 through wireless or wired communication, or from an external storage device such as a universal serial bus (USB) memory connected to the recording apparatus 1. Any communication system can be used for the wireless or wired communication. A communication system such as Wireless Fidelity (Wi-Fi)® or Bluetooth® can be used for the wireless communication. A communication system such as a USB can be used for the wired communication. When a reading command is received from the host apparatus 400, for example, the main controller 101 transmits the command to the scanner unit 3 via the scanner engine IT 109.

An operation panel 104 is a mechanism which allows a user to perform input/output operation with respect to the recording apparatus 1. Through the operation panel 104, the user can instruct a copying or scanning operation, set a printing mode, and recognize the information about the recording apparatus 1.

The print controller 202 configured of a CPU, included in the print engine unit 200, uses a RAM 204 as a work area to control various mechanisms included in the printing unit 2 according to a program or various parameters stored in a ROM 203. When various commands or image data are received via a controller I/F 201, the print controller 202 temporarily saves the commands or the image data in the RAM 204. In order to enable the recording head 8 to use the image data for executing recording operation, the print controller 202 controls the image processing controller 205 to convert the saved image data to recording data. When the recording data is generated, the print controller 202 controls the recording head 8 via a head I/F 206 to execute recording operation based on the recording data. At this time, the print controller 202 drives the feeding units 6A and 6B, the conveyance roller 7, the discharge roller 12, and the flapper 11 illustrated in FIG. 1 via a conveyance control unit 207 to convey the recording medium S. According to the instruction from the print controller 202, a recording operation is executed by the recording head 8 in cooperation with the conveyance operation of the recording medium S, so that printing processing is executed.

A head carriage control unit 208 changes the orientation or the position of the recording head 8 depending on the operation state, such as the maintenance state or the recording state, of the recording apparatus 1. An ink supply control unit 209 controls the ink supply unit 15 such that the pressure of ink supplied to the recording head 8 is kept within an appropriate range. A maintenance control unit 210 controls the operations of the cap unit 10 and the wiping unit 17 included in the maintenance unit 16 when a maintenance operation is executed on the recording head 8.

A contamination detection control unit 211 processes the output data of the conveyance control unit 207 saved in the RAM 204, and notifies the operation panel 104 about an instruction for prompting the user to perform cleaning via the controller I/F 201 if a value of the output data exceeds the threshold value. A sequence of the above processing will be described below in detail.

The main controller 101 uses the RAM 106 as a work area to control hardware resources of a scanner controller 302 of the scanner engine unit 300 according to a program or various parameters stored in the ROM 107. With this configuration, various mechanisms included in the scanner unit 3 are controlled. For example, the main controller 101 controls the hardware resources of the scanner controller 302 via a controller I/F 301, so that a document placed on the ADF by the user is conveyed via the conveyance control unit 304 and read by a sensor 305. Then, the scanner controller 302 stores the read image data in a RAM 303. As described above, by converting the acquired image data to recording data, the print controller 202 enables the recording head 8 to execute recording operation based on the image data read by the scanner controller 302.

Figure 3:
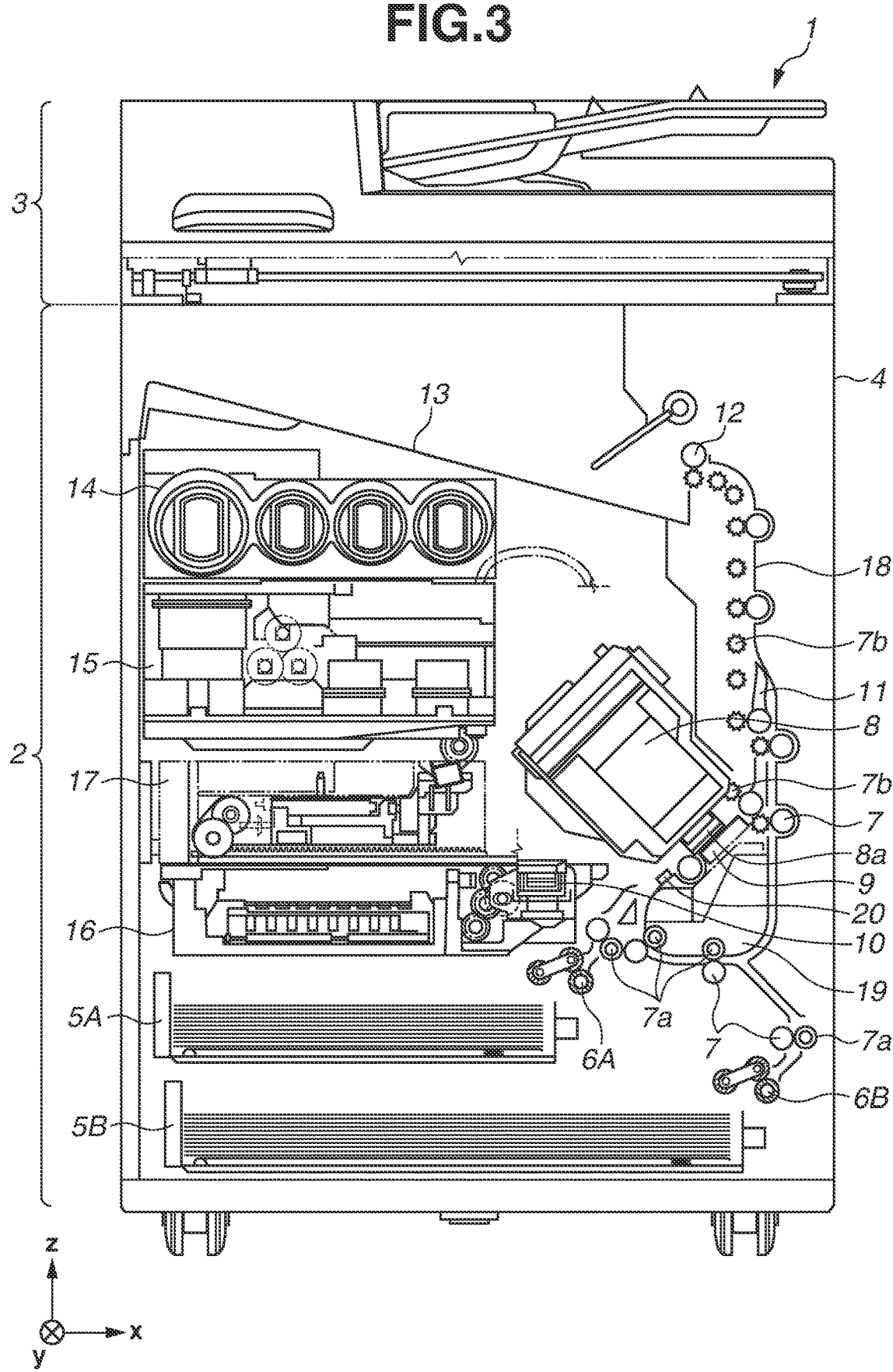
FIG. 3 is a diagram illustrating a state where the recording apparatus is in a recording state.

FIG. 3 is a cross-sectional diagram illustrating the recording apparatus 1 in a recording state. The recording state refers to a state where the recording head 8 is positioned in a recording position, so that an image can be recorded on a recording medium. The cap unit 10 is separated from the discharge port face 8a of the recording head 8, and the discharge port face 8a is positioned opposite to the platen 9 when compared to the stand-by state of the recording apparatus 1 illustrated in the cross-sectional diagram in FIG. 1. The stand-by state refers to a state where the recording head 8 is positioned in a stand-by position, and is not executing recording of an image. In the present exemplary embodiment, a plain face of the platen 9 is inclined at an angle of 45 degrees with respect to the horizontal direction, and the discharge port face 8a of the recording head 8 positioned at the recording position is also inclined at an angle of 45 degrees with respect to the horizontal direction. Thus, a distance between the discharge port face 8a and the platen 9 is maintained constant.

When the recording head 8 is moved to the recording position in FIG. 3 from the stand-by position in FIG. 1, the print controller 202 moves the cap unit 10 to a retracted position illustrated in FIG. 3 using the maintenance control unit 210. In this state, the discharge port face 8a of the recording head 8 is separated from a cap member included in the cap unit 10. Thereafter, the print controller 202 rotates the recording head 8 by 45 degrees while adjusting the height in the vertical direction using the head carriage control unit 208 such that the discharge port face 8a is positioned opposite to the platen 9. After the recording operation is completed, the print controller 202 executes the above processing in the reverse order to move the recording head 8 to the stand-by position from the recording position.

Next, a conveyance path of the recording medium S in the printing unit 2 will be described. When a recording command is received, first, the print controller 202 moves the recording head 8 to the recording position illustrated in FIG. 3 using the maintenance control unit 210 and the head carriage control unit 208. Thereafter, the print controller 202 drives one of the first feeding unit 6A and the second feeding unit 6B according to the recording command and feeds the recording medium S, using the conveyance control unit 207.

When the recording medium S enters a position (medium path portion) opposite to the sheet detection sensor 20 according to the present invention, output of the sheet detection sensor 20 is changed as described below. In the present exemplary embodiment, the medium path portion includes at least a part of a path of light reflected from the reflection plate and then received by the light receiving element. The sheet detection sensor 20 can identify the presence or absence of the recording medium S in the medium path portion as well as the times when the leading edge and the trailing edge of the recording medium S have passed through the medium path portion by comparing the output value and a specified threshold value. By using the above-described function, the recording apparatus 1 can adjust a position of the recording medium S being conveyed and identify a conveyance failure and a sheet length, so that printing operation can be executed stably.

A program for realizing one or more functions of the recording apparatus 1 of the present exemplary embodiment may be supplied to the apparatus via a network or various recording media, so that a computer (a CPU or a micro processing unit (MPU)) of the apparatus reads the program to execute the functions. Further, the program may be executed by a single computer, or may be cooperatively executed by a plurality of computers. Further, not all of the above-described processing has to be realized by software, and all or a part of the processing may be realized by hardware, such as an application specific integrated circuit (ASIC). Furthermore, not all of the processing has to be executed by a single CPU, and a plurality of CPUs may appropriately cooperate with each other to execute the processing, or a part of the processing may be executed by a single CPU whereas the other part of the processing may be cooperatively executed by a plurality of CPUs.

Figure 4A:
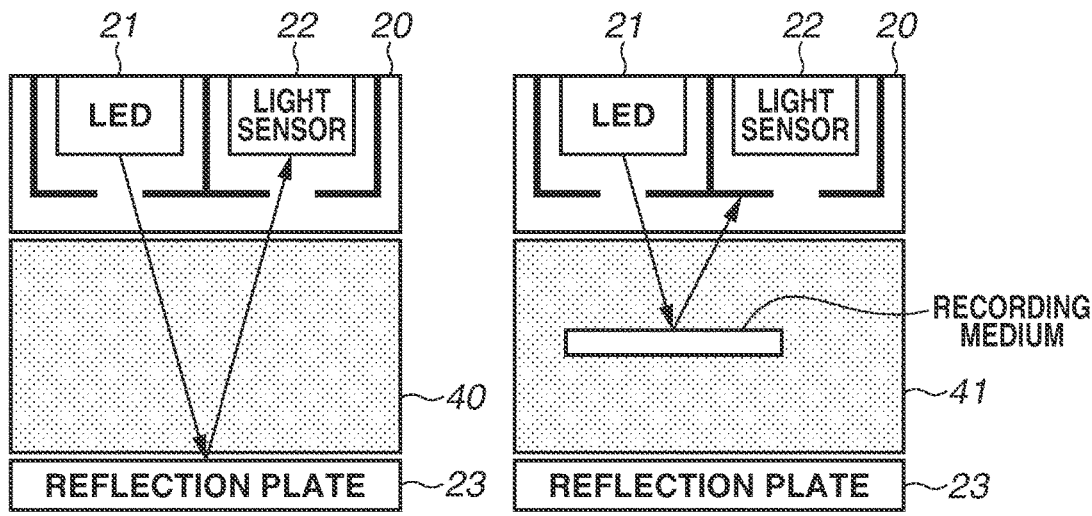
FIG. 4A is a diagram illustrating a schematic configuration of a sheet detection sensor.
Figure 4B:
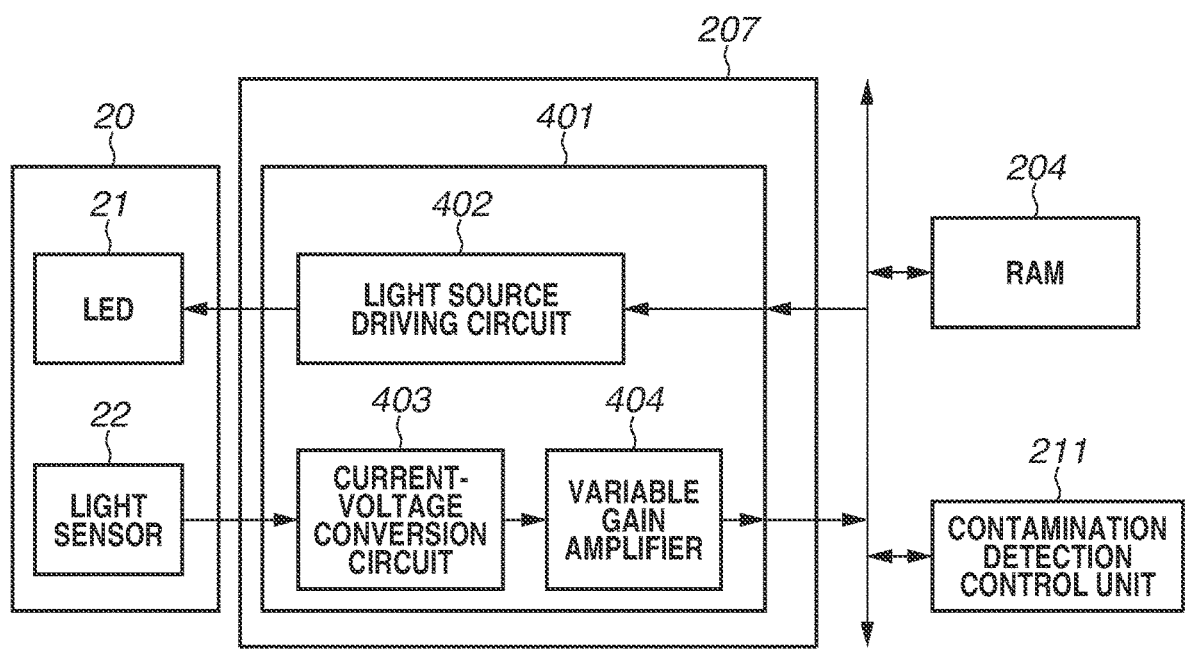
FIG. 4B is a diagram illustrating a peripheral configuration of the sheet detection sensor.

FIG. 4A is a diagram illustrating a schematic configuration of the sheet detection sensor 20, and FIG. 4B is a block diagram illustrating a peripheral configuration of the sheet detection sensor 20.

The sheet detection sensor 20 includes a light-emitting diode (LED) 21 serving as a light emitting element for emitting infrared light and a light sensor 22 serving as a light receiving element. The reflection plate 23 is arranged at a position opposite to the sheet detection sensor 20, with the medium path portion through which the recording medium passes therebetween. Light emitted from the LED 21 is reflected on the reflection plate 23. This reflection light is received by the light sensor 22.

Herein, a state 40 illustrates a state where the recording medium is not passing through the medium path portion opposite to the sheet detection sensor 20, whereas a state 41 illustrates a state where the recording medium is passing through the medium path portion opposite to the sheet detection sensor 20. In the state 40 where the recording medium is not passing through the medium path portion opposite to the sheet detection sensor 20, the light sensor 22 directly receives light reflected from the reflection plate 23. In the state 41 where the recording medium is passing through the medium path portion opposite to the sheet detection sensor 20 (i.e., a state where the recording medium exists in the path of light emitted from the LED 21), the light sensor 22 receives light reflected from the recording medium.

Because the recording medium absorbs or transmits a part of light, the amount of light reflected from the recording medium is smaller than the amount of light reflected from the reflection plate 23. In the present exemplary embodiment, the light sensor 22 and the reflection plate 23 are arranged such that an amount of reflection light from the reflection plate 23 that has reached the light sensor 22 becomes substantially the maximum light amount detectable by the light sensor 22. Therefore, when the recording medium is passing through the medium path portion, the light receiving amount of the light sensor 22 is sufficiently smaller than the light receiving amount of light reflected from the reflection plate 23.

The recording apparatus 1 according to the present exemplary embodiment can detect the presence and absence of the recording medium in the medium path portion and a position of the leading edge or a position of the trailing edge of the recording medium based on the amount of light (light receiving amount) received by the light sensor 22.

In addition, a positional relationship between the LED 21, the light sensor 22, the medium path portion, and the reflection plate 23 in the sheet detection sensor 20 is not limited to the positional relationship described in the above-described exemplary embodiment. The constituent elements may be arranged such that the recording medium passes through at least a part of the path of reflection light reflected on the reflection plate and then received by the light sensor 22.

A peripheral configuration of the sheet detection sensor 20 will be described with reference to FIG. 4B.

As illustrated in FIG. 4B, the sheet detection sensor 20 is connected to the conveyance control unit 207, the RAM 204 and the contamination detection control unit 211. The conveyance control unit 207 includes a sheet detection sensor control unit 401. The sheet detection sensor control unit 401 includes a light source driving circuit 402, a current-voltage conversion circuit 403, and a variable gain amplifier 404. The light source driving circuit 402 changes the amount of light emitted from the LED 21. The current-voltage conversion circuit 403 converts photo-electric current output from the light sensor 22 to voltage based on the light receiving amount. The variable gain amplifier 404 changes the sensitivity of the light sensor 22. In the present exemplary embodiment, photo-electric current output from the light sensor 22 is converted to voltage by the current-voltage conversion circuit 403 based on the light receiving amount, and analog-to-digital (A/D) conversion and inverting amplification are further performed on the acquired voltage. Then, the acquired value is defined as a sensor detection amount. The sheet detection sensor control unit 401 controls the sheet detection sensor 20 to periodically acquire the sensor detection amount and stores the acquired sensor detection amount in the RAM 204 in a sensor detection amount waveform.

The contamination detection control unit 211 detects whether the reflection plate 23 is contaminated based on the sensor detection amount waveform of the conveyance control unit 207 saved in the RAM 204. For example, the reflection plate 23 is contaminated with paper dust generated from a sheet when the sheet is conveyed, or ink dispersed when printing is executed. If the reflection plate 23 is contaminated, a light reflectance of the reflection plate 23 is deteriorated. In the present exemplary embodiment, in a case where the light reflectance of the reflection plate 23 is deteriorated, occurrence of contamination in the reflection plate 23 is detected, and processing according to the detection result is executed in order to recover the deteriorated light reflectance. The processing for detecting occurrence of contamination in the reflection plate 23 corresponds to processing for determining whether the light reflectance of the reflection plate 23 is lowered. Further, the contamination detection control unit 211 extracts the sensor detection amount when the recording medium is passing through the medium path portion opposite to the sheet detection sensor 20, and compares the extracted sensor detection amount with a preset value, thereby executing contamination detection control processing.

Figure 5:
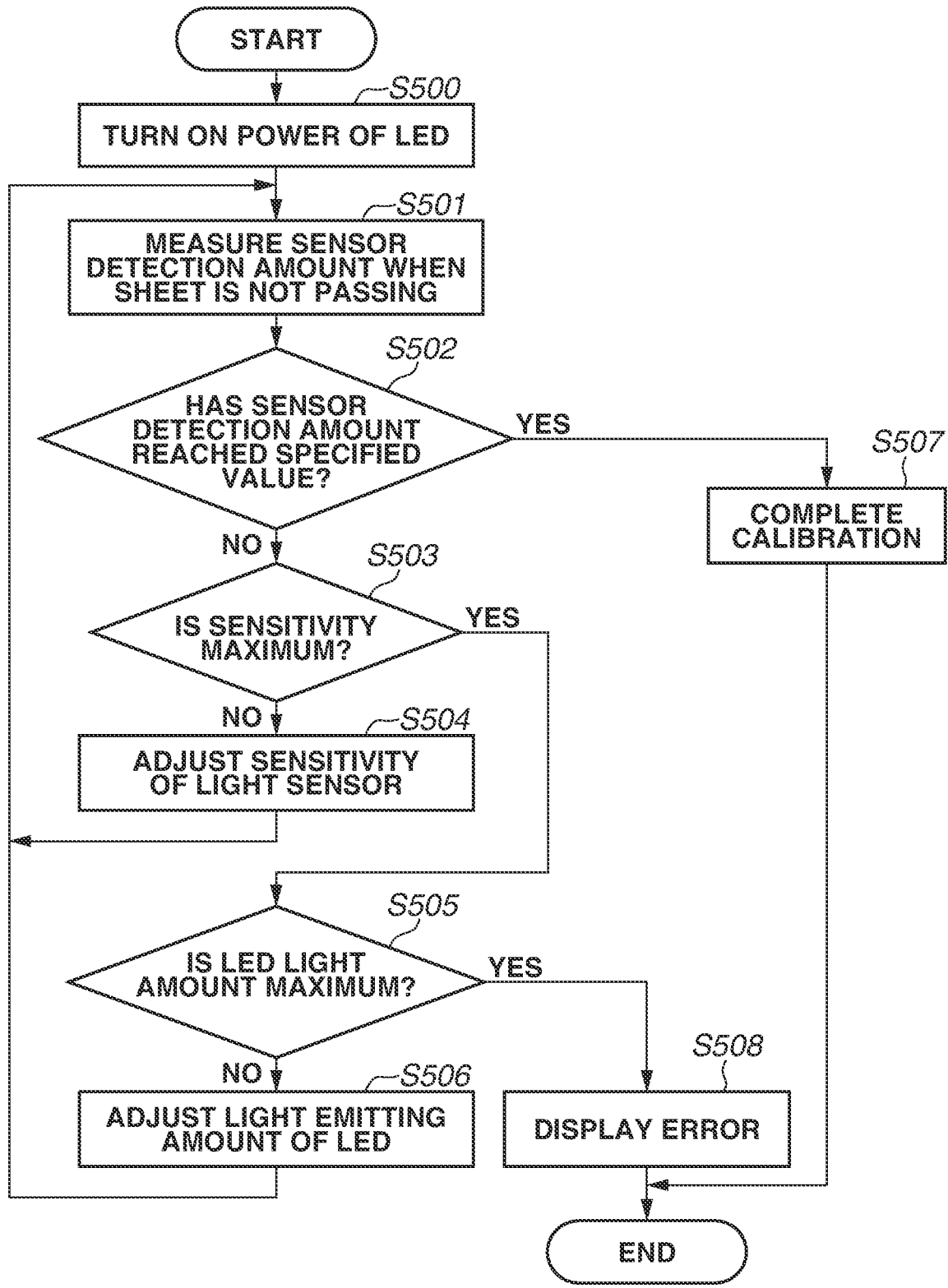
FIG. 5 is a flowchart illustrating calibration processing executed by a detection apparatus.

FIG. 5 is a flowchart illustrating calibration processing (control processing) executed by the recording apparatus 1. The calibration processing is control processing for controlling the sensor detection amount based on the amount of light received from the reflection plate 23 when the recording medium is not passing through the medium path portion opposite to the sheet detection sensor 20 to be constant at a specified value. Specifically, the calibration processing is processing for controlling at least one of the amount of light emitted from the LED 21 and the sensitivity of the light sensor 22. Practically, the main controller 101 reads a program stored in a memory, such as the ROM 107, to the RAM 106 and executes the program to realize the processing illustrated in this flowchart. Further, when the calibration processing is executed, the recording medium is controlled not to pass through the medium path portion.

First, in S500, the recording apparatus 1 turn on the power of the LED 21. The LED 21 starts emitting light thereby.

In S501, after an amount of light emitted from the LED 21 becomes stable, the recording apparatus 1 measures the sensor detection amount (i.e., an amount of light received from the reflection plate 23) in a period when the recording medium is not passing through the medium path portion opposite to the sheet detection sensor 20.

In S502, the recording apparatus 1 determines whether the sensor detection amount measured in S501 has reached the specified value. The specified value is a threshold value for determining whether the calibration processing is completed (i.e., whether the sensor detection amount of the sheet detection sensor control unit 401 has become an appropriate value). If the determination result is "YES" (YES in S502), the processing proceeds to S507. In S507, the recording apparatus 1 determines that the calibration processing is completed, and the calibration processing is ended. On the other hand, if the determination result is "NO" (NO in S502), the processing proceeds to S503, and the recording apparatus 1 executes the processing of S503.

In S503, the recording apparatus 1 determines whether the sensitivity of the light sensor 22 is maximum. If the determination result is "NO" (NO in S503), the processing proceeds to S504, and the recording apparatus 1 executes the processing of S504. If the determination result is "YES" (YES in S503), the processing proceeds to S505, and the recording apparatus executes the processing of S505.

In S504, the recording apparatus 1 increases the sensitivity of the light sensor by changing the gain by the variable gain amplifier 404. "Sensitivity" refers to a degree of the sensor detection amount output with respect to a certain light receiving amount. By increasing the sensitivity, even if the same amount of light is received, the sensor detection amount is lowered because the sensor detection amount is inversely amplified.

In S505, the recording apparatus 1 determines whether the amount of light emitted by the LED 21 is maximum. If the determination result is "NO" (NO in S505), the processing proceeds to S506, and the recording apparatus executes the processing of S506. If the determination result is "YES", this indicates that the sensor detection amount acquired by the sheet detection sensor control unit 401 has not reached the specified value, even if the amount of light emitted by the LED 21 is adjusted, by adjusting the sensitivity of the light sensor 22 by the variable gain amplifier 404. Therefore, if the determination result is "YES" (YES in S505), the processing proceeds to S508, and the recording apparatus 1 executes the processing of S508.

In S506, the recording apparatus 1 increases the amount of light emitted by the LED 21.

In S508, the recording apparatus 1 notifies the user of the occurrence of an error in the calibration processing. Specifically, the recording apparatus 1 displays a screen for notifying the user of the occurrence of an error in the calibration processing on the operation panel 104 (e.g., display unit), or transmits, to the host apparatus 400, information for displaying the notification screen on a display unit of the host apparatus 400. For example, an error occurs because of a malfunction of the light sensor 22 or the LED 21 or because of contamination of the reflection plate 23. An area for notifying the above cause may be included in the screen for notifying the user of the occurrence of an error in the calibration processing. Further, in S508, the below-described processing for recovering the light reflectance of the reflection plate 23 may be executed.

If the calibration processing is not executed, the recording apparatus 1 cannot determine whether the cause of a change in the sensor detection amount is a lowering of the light amount of the LED 21, a deterioration of the light sensor 22, a change in the environmental temperature, or contamination of the reflection plate 23.

Therefore, it is desirable that the calibration processing be executed frequently. For example, the calibration processing is executed at a timing when the power of the sheet detection sensor 20 is turned on. Specifically, the calibration processing is executed at a timing, for example, when the power of the recording apparatus 1 is turned on, when the recording apparatus 1 has returned from a sleep state, when the first feeding unit 6A or the second feeding unit 6B is set the recording apparatus 1, or when a cover arranged on the housing of the recording apparatus 1 and used for exposing an inner portion is closed.

Figure 6A:
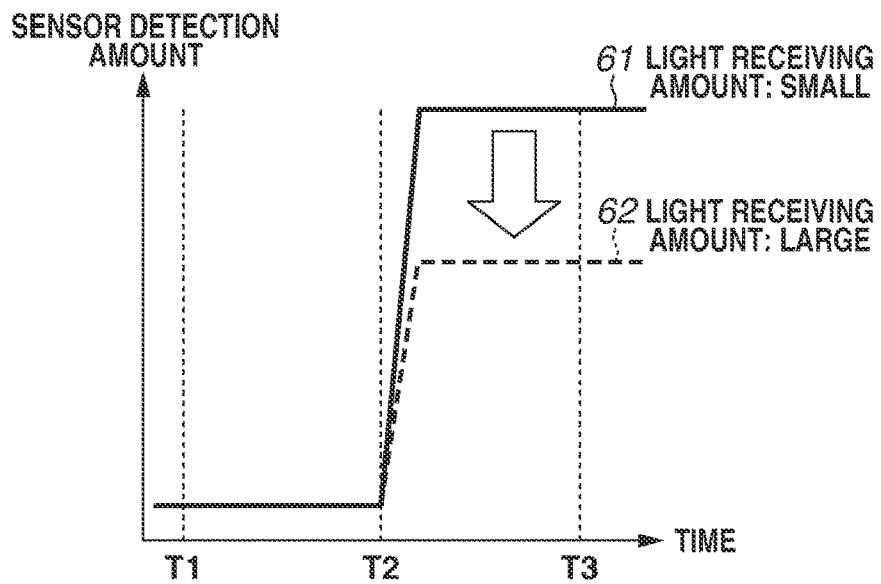
FIGS. 6A and 6B are diagrams illustrating contamination detection control processing executed by the detection apparatus.

FIG. 6A is a graph illustrating a chronological change of the sensor detection amount in a state where the sensor detection amount acquired in a state where the recording medium is not passing through the medium path portion opposite to the sheet detection sensor 20 is adjusted to the specified value by the calibration processing. In the present exemplary embodiment, the sensor detection amount will be greater if an amount of light received by the light sensor 22 is smaller because the output of the sheet detection sensor control unit 401 is inversely amplified by the variable gain amplifier 404. An output waveform 61 illustrates a sensor detection amount acquired in a state where the reflection plate 23 is not contaminated (or slightly contaminated), and an output waveform 62 illustrates a sensor detection amount acquired in a state where the reflection plate 23 is contaminated. In FIG. 6A, it is assumed that the recording medium starts passing through the medium path portion opposite to the sheet detection sensor 20 at time T2.

Because the calibration processing is executed, the sensor detection amount acquired in a state (a period between time T1 and T2) where the recording medium is not passing through the medium path portion opposite to the sheet detection sensor 20 has become constant at a specified value (e.g., 0.5 V). Thereafter, in a state (a period between time T2 and T3) where the recording medium is passing through the medium path portion opposite to the sheet detection sensor 20, an amount of light received by the light sensor 22 is smaller (i.e., sensor detection amount is increased).

Because a reflection efficiency of the reflection plate 23 is lowered when contamination of the reflection plate 23 has progressed, the light receiving amount of the light sensor 22 acquired in a state where the recoding medium is not passing through the medium path portion opposite to the sheet detection sensor 20 is lowered. However, if the calibration processing is executed, the sensor detection amount based on the light receiving amount of the light sensor 22 acquired in a state where the recording medium is not passing through the medium path portion opposite to the sheet detection sensor 20 is adjusted to the specified value. In other words, at least one of the light emitting intensity of the LED 21 and the light receiving sensitivity of the light sensor 22 is increased based on lowering of the light receiving amount caused by contamination of the reflection plate 23.

If the recording medium passes through the medium path portion opposite to the sheet detection sensor 20 in a state where at least one of the light emitting intensity of the LED 21 and the light receiving sensitivity of the light sensor 22 is increased by the calibration processing, the sensor detection amount becomes lower than the sensor detection amount before execution of the calibration processing. In other words, in a state where the recording medium is passing through the medium path portion opposite to the sheet detection sensor 20, the sensor detection amount is lowered due to the contamination of the reflection plate 23, i.e., the lowering of reflection efficiency. The sensor detection amount is lowered as the reflection efficiency is lower because the sensor detection amount is inversely amplified. Therefore, if the sensor detection amount is not inversely amplified, the sensor detection amount will be increased when the reflection efficiency is lower.

Figure 6B:
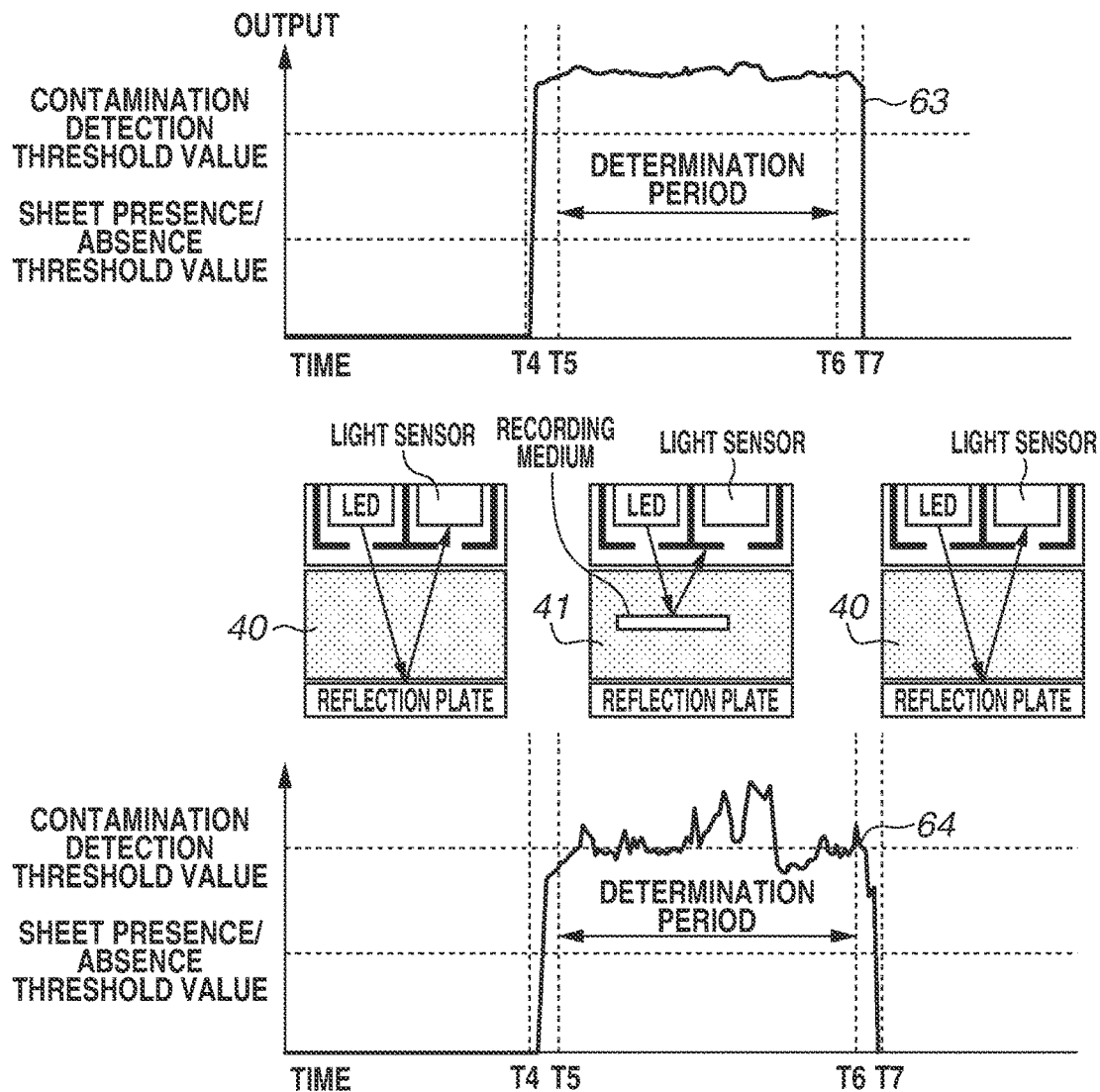

A graph on the upper side in FIG. 6B illustrates a chronological change of the sensor detection amount (normal sensor detection amount) in a state where the calibration processing has been executed when the reflection plate 23 is not contaminated. Further, a graph on the lower side in FIG. 6B illustrates chronological change of the sensor detection amount (abnormal sensor detection amount) in a state where the calibration processing has been executed when the reflection plate 23 is contaminated. An output waveform 63 is an output waveform of the normal sensor detection amount, whereas an output waveform 64 is an output waveform of the abnormal sensor detection amount.

Lowering of the sensor detection amount caused by contamination of the reflection plate 23 does not occur in the normal sensor detection amount acquired in a state (state 41) where the recording medium is passing through the medium path portion opposite to the sheet detection sensor 20. Thus, a value of the normal sensor detection amount acquired in the state (state 41) where the recording medium is passing through the medium path portion opposite to the sheet detection sensor 20 exceeds a contamination detection threshold value.

Meanwhile, lowering of the sensor detection amount caused by contamination of the reflection plate 23 occurs in the abnormal sensor detection amount acquired in the state (state 41) where the recording medium is passing through the medium path portion opposite to the sheet detection sensor 20. Thus, a value of the abnormal sensor detection amount acquired in the state (state 41) where the recording medium is passing through the medium path portion opposite to the sheet detection sensor 20 falls below the contamination detection threshold value.

As described above, after the calibration processing is executed, the sensor detection amount acquired in the state (state 41) where the recording medium is passing through the medium path portion opposite to the sheet detection sensor 20 is changed depending on whether the reflection plate 23 is contaminated. In the present exemplary embodiment, based on the above-described fundamental rule, the recording apparatus 1 can detect a lowering of reflection efficiency of the reflection plate 23 and determine a degree of contamination of the reflection plate 23.

In the present exemplary embodiment, the recording apparatus 1 executes detection processing for determining whether the reflection plate 23 is contaminated, using the sensor detection amount acquired in the state (state 41) where the recording medium is passing through the medium path portion opposite to the sheet detection sensor 20.

Therefore, at first, the recording apparatus 1 identifies a sensor detection amount acquired in the state (state 41) where the recording medium is passing through the medium path portion opposite to the sheet detection sensor 20. Specifically, the recording apparatus 1 firstly identifies a time when conveyance of the recording medium is ended based on the time when the print job is ended. Then, the recording apparatus 1 traces the time back to identify a time when the sensor detection amount has reached a sheet presence/absence threshold value (i.e., time when the sensor detection amount is increased rapidly), and further back to identify the time when the sensor detection amount has reached the sheet presence/absence threshold value again (i.e., time when the sensor detection amount is lowered rapidly). With this processing, the recording apparatus 1 identifies the sensor detection amount acquired in the state (state 41) where the recording medium is passing through the medium path portion opposite to the sheet detection sensor 20. A range of the sensor detection amount (hereinafter, "determination range") identified as described above is used for executing the below-described determination. Further, in consideration of the influence of noise, a range excluding the sensor detection amounts acquired at several time points immediately after the time when the sensor detection amount has reached the sheet presence/absence threshold value and the sensor detection amounts acquired at several time points immediately after the time when the sensor detection amount has reached the sheet presence/absence threshold value again can be used as the determination range.

In the present exemplary embodiment, if the sensor detection amount falls below the contamination detection threshold value even once within the determination range, the recording apparatus 1 determines that the reflection plate 23 is contaminated.

In addition, the sheet presence/absence threshold value is a threshold value for identifying whether the recording medium is passing through the medium path portion opposite to the sheet detection sensor 20. The sheet presence/absence threshold value is a value corresponding to the light amount larger than the light amount the contamination detection threshold value corresponds to. In a case where the sensor detection amount has reached the sheet presence/absence threshold value, the recording apparatus 1 detects that the recording medium is passing through the medium path portion opposite to the sheet detection sensor 20. Further, the contamination detection threshold value and the sheet presence/absence threshold value are set with a sufficient margin therebetween, and contamination detection control processing is executed frequently. With this configuration, contamination of the reflection plate 23 can be detected before a presence or absence of the recording medium is detected erroneously because of a lowering of the sensor detection amount caused by contamination of the reflection plate 23.

In the present exemplary embodiment, there is a case where the print controller 202 stops conveying the recording medium before conveyance of the recording medium is ended (i.e., before the printing medium is printed and discharged from a discharge port). Specifically, conveyance of the recording medium may be stopped when processing for drying and fixing ink applied on the recording medium, processing for suppressing generation of a curl on the recording medium, or processing for inverting the recording medium to execute both side printing is to be executed.

Then, because conveyance of the recording medium is stopped at an optional timing, for example, the recording medium is stopped at a position where an edge portion thereof is positioned immediately below the sheet detection sensor 20.

Figure 7A:
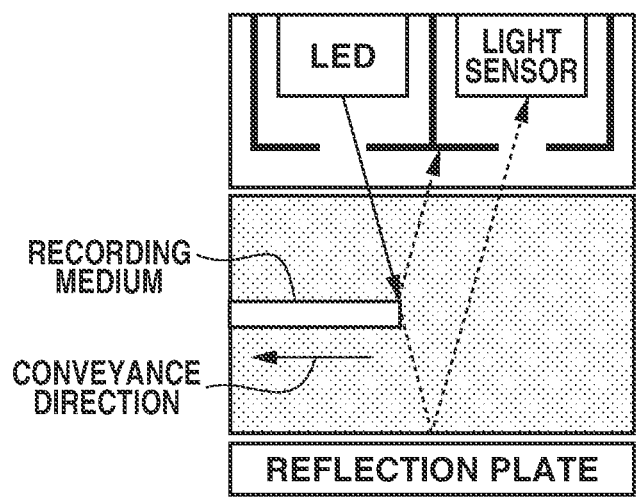
FIG. 7A is a diagram illustrating a positional relationship between a recording medium stopped temporarily and a sheet detection sensor.
Figure 7B:
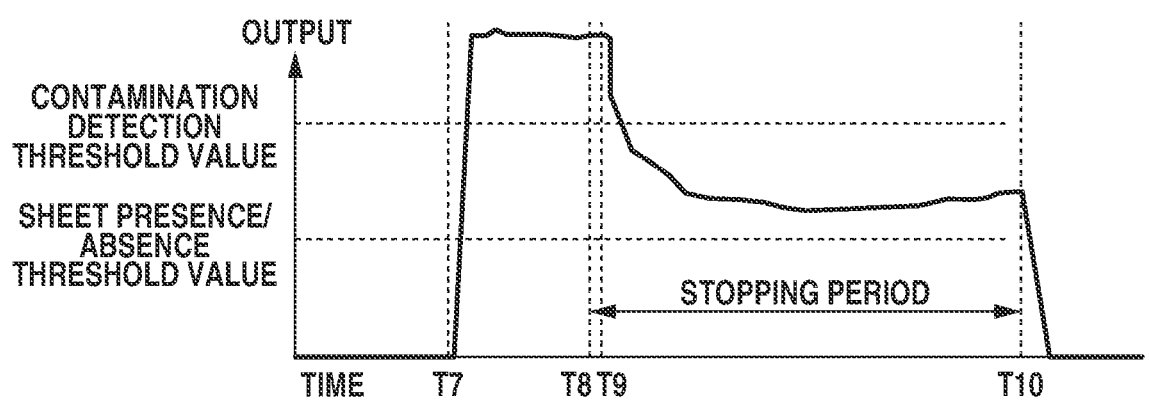
FIG. 7B is a graph illustrating a detection amount acquired in a state where the recording medium is temporarily stopped as illustrated in FIG. 7A.

FIG. 7A is a diagram illustrating a positional relationship between the recording medium S stopped temporarily and the sheet detection sensor 20, and FIG. 7B is a graph illustrating a detection amount acquired when the recording medium S is stopped temporarily in a state illustrated in FIG. 7A.

In FIG. 7B, time T7 represents a time at which the state (state 41) where the recording medium is passing through the medium path portion opposite to the sheet detection sensor 20 is started. Further, in FIG. 7B, conveyance of the recording medium is temporarily stopped during a period between time T8 and time T10. As illustrated in FIG. 7A, depending on the position where the recording medium is stopped, light emitted from the LED 21 is incident on the edge portion of the recording medium. In this case, during a period immediately after the recording medium is stopped, almost all of the light emitted from the LED 21 is reflected on the edge portion of the recording medium. The above-described state occurs during a period between time T8 and time T9. However, for example, there is a case where the edge portion of the recording medium is slightly moved due to its own weight, and elongated or contracted because of ink applied thereto when the recording medium is stopped. This may lead to a situation where a part of the light emitted from the LED 21 is reflected on the edge portion of the recording medium whereas a remaining part of the light that is not reflected on the edge portion of the recording medium is reflected on a reflection member. The above-described state occurs during a period between time T9 and time T10. Then, as illustrated in FIG. 7B, because the detection amount in the above state is smaller than the detection amount in the state 40 and greater than the detection amount in the state 41, the detection amount is likely to fall below the contamination detection threshold value. As a result, there is a case where contamination of the reflection plate 23 is detected erroneously (determination is made erroneously) even though the reflection plate 23 is not contaminated.

Therefore, in the present exemplary embodiment, a method for suppressing an erroneous determination that is made depending on a stopping position of the recording medium will be described.

Figure 8:
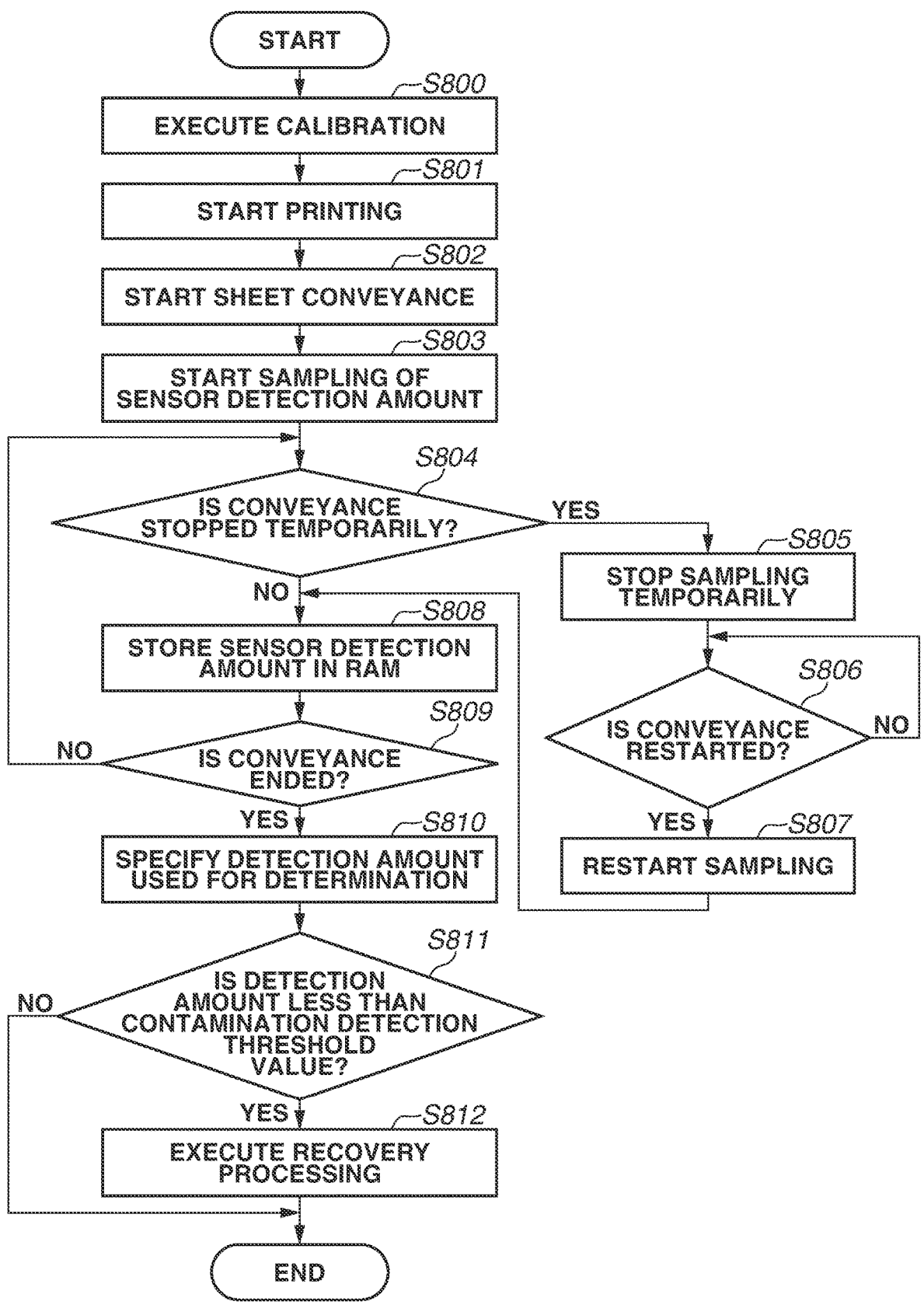
FIG. 8 is a flowchart illustrating processing for stopping and restarting acquisition of a sensor output amount executed in cooperation with stopping and restarting of conveyance operation.

FIG. 8 is a flowchart illustrating contamination detection control processing executed by the recording apparatus 1. Practically, the main controller 101 reads a program stored in a memory, such as the ROM 107, to the RAM 106 and executes the program to realize the processing illustrated in this flowchart. For example, the processing illustrated in the flowchart is executed when a printing job is received from the host apparatus 400.

In S800, the recording apparatus 1 executes calibration processing illustrated in FIG. 5. With this processing, the sensor detection amount acquired in a state where the recording medium is not passing through the medium path portion opposite to the sheet detection sensor 20 is adjusted to be constant at a specified value.

In S801, the recording apparatus 1 starts executing printing control based on the print job received from the host apparatus 400.

In S802, the recording apparatus 1 starts conveying the recording medium based on the received print job.

In S803, the recording apparatus 1 starts sampling (acquisition) of the sensor detection amount with a specific period.

In S804, the recording apparatus 1 determines whether conveyance of the recording medium is stopped before conveyance thereof is completed. Specifically, when processing for drying ink applied on the recording medium, processing for suppressing generation of a curl on the recording medium, or processing for inverting the recording medium for executing duplex printing is executed, the recording apparatus 1 determines whether an instruction for stopping the operation is transmitted to the conveyance mechanism. If the determination result is "YES" (YES in S804), the processing proceeds to S805, and the recording apparatus 1 executes the processing in S805. If the determination result is "NO" (NO in S804), the processing proceeds to S808, and the recording apparatus 1 executes the processing in S808.

In S805, the recording apparatus 1 stops sampling of the sensor detection amount. In other words, the recording apparatus 1 executes control processing for stopping sampling of the sensor detection amount when conveyance of the recording medium is stopped.

In S806, the recording apparatus 1 determines whether conveyance of the recording medium is restarted. If the determination result is "YES" (YES in S806), the processing proceeds to S807, so that the recording apparatus 1 executes the processing in S807. If the determination result is "NO" (NO in S806), the recording apparatus 1 repeatedly executes the processing in S806 until conveyance of the recording medium is restarted.

In S807, the recording apparatus 1 restarts sampling of the sensor detection amount.

In S808, the recording apparatus 1 stores the sampled sensor detection amount in the RAM 204 in a waveform as illustrated in FIGS. 6A and 6B. In addition, the waveform stored at this moment does not include the detection amount acquired in a period when sampling is stopped.

In S809, the recording apparatus 1 determines whether a conveyance operation of the recording medium is ended. If the determination result is "YES" (YES in S809), the processing proceeds to S810, and the recording apparatus 1 executes the processing in S810. If the determination result is "NO" (NO in S809), the processing returns to the processing in S804.

In S810, the recording apparatus 1 reads out the waveform of the sensor detection amount after starting printing control from the RAM 204, and identifies the sensor detection amount used for contamination detection determination processing.

Specifically, the recording apparatus 1 firstly identifies a period corresponding to the state (state 41) where the recording medium is passing through the medium path portion opposite to the sheet detection sensor 20. The period corresponding to the state 41 is a period between a time when the detection amount rises from 0 (i.e., time T4 in FIG. 6B) and a time when the detection amount falls down to 0 (i.e., time T7 in FIG. 6B). Then, the recording apparatus 1 identifies a period between a time (time T5 in FIG. 6B) after a predetermined time has passed since the detection amount rises from 0 and a time (time T6 in FIG. 6B) a predetermined time before the detection amount falls down to 0 as the determination period. Then, the recording apparatus 1 identifies the sensor detection amount acquired during the determination period as the sensor detection amount used for contamination detection determination processing.

In S811, the recording apparatus 1 detects whether the reflection plate 23 is contaminated based on the sensor detection amount identified in S810. Specifically, the recording apparatus 1 determines whether the sensor detection amount identified in S810 falls below the contamination detection threshold value. If the determination result is "YES" (YES in S811), the processing proceeds to S812, and the recording apparatus 1 executes the processing in S812. If the determination result is "NO" (NO in S811), the processing is ended.

In S812, because the determination result in S811 is "YES", the recording apparatus 1 executes processing for recovering the light reflectance of the reflection plate 23. For example, notification processing for notifying the user of contamination of the reflection plate 23 is executed as the recovery processing. Specifically, as the notification processing, for example, the recording apparatus 1 displays, on the operation panel 104, a notification screen for notifying the user of contamination of the reflection plate 23, or transmits, to the host apparatus 400, information for displaying the notification screen on a display unit of the host apparatus 400. In addition, for example, an area displaying a message for instructing the user to clean the reflection plate 23 or an area representing a cleaning method of the reflection plate 23 to the user may be included in the notification screen. Further, processing for simply notifying the user of an error or processing for prompting the user to perform maintenance work of the recording apparatus 1 may be executed in S812. Further, processing for prompting the user to call a service engineer to recover the error occurring in the reflection plate 23 may be executed.

Contamination of the reflection plate 23 can be detected by employing the configuration according to the present exemplary embodiment. Therefore, if the reflection plate 23 is contaminated, it is possible to notify the user of the contamination. Eventually, the user is prompted to clean the reflection plate 23, so that occurrence of an error conveyance failure) caused by contamination of the reflection plate 23 can be suppressed.

Further, in the present exemplary embodiment, a leading edge or a trailing edge of the recording medium is detected, and contamination of the reflection plate 23 is detected based on the sensor detection amount for executing conveyance control. In other words, conveyance control processing and contamination detection control processing are executed by using the same data. Therefore, the recording apparatus 1 does not need to newly acquire the sensor detection amount for executing contamination detection control processing. Therefore, a load of the recording apparatus 1 can be reduced.

Further, in the present exemplary embodiment, contamination detection processing of the reflection plate 23 is not executed based on the detection amount acquired during a period when conveyance of the recording medium is stopped temporarily. In other words, in the present exemplary embodiment, contamination detection processing of the reflection plate 23 is executed based on the detection amount acquired during a period when conveyance of the recording medium is not stopped temporarily (i.e., a period when the recording medium is conveyed (moved)). Therefore, it is possible to suppress erroneous determination that can occur in the contamination detection processing of the reflection plate 23 when conveyance of the recording medium is stopped temporarily.

Other Exemplary Embodiments

In the above-described exemplary embodiment, notification processing is executed if even one sensor detection amount falling below the contamination detection threshold value exists in the plurality of sensor detection amounts acquired in the state (state 41) where the recording medium is passing through the medium path portion opposite to the sheet detection sensor 20. However, the exemplary embodiment is not limited thereto. For example, the notification processing may be executed if a value acquired from a moving average of the plurality of sensor detection amounts exceeds the contamination detection threshold value. Further, the notification processing may be executed if more than one sensor detection amount exceeds the contamination detection threshold value from among the plurality of sensor detection amounts. Further, the notification processing may be executed if a plurality of consecutive sensor detection amounts exceeds the contamination detection threshold value from among the plurality of sensor detection amounts. Furthermore, the notification method (e.g., content of a notification screen) may be changed depending on the number of sensor detection amounts exceeding the contamination detection threshold value or the number of sensor detection amounts consecutively exceeding the contamination detection threshold value.

Further, in the exemplary embodiment described above, when contamination of the reflection plate 23 is detected, notification processing is executed as the processing for recovering the light reflectance of the reflection plate 23 in S812. However, the exemplary embodiment is not limited thereto. For example, a constituent element for cleaning the contaminated reflection plate 23 is added to the recording apparatus 1. Then, as the processing for recovering the light reflectance of the reflection plate 23, cleaning processing for automatically cleaning the reflection plate 23 may be executed by the recording apparatus 1.

Although, in the above-described exemplary embodiments, a value output from the sheet detection sensor control unit 401 is inversely amplified by the variable gain amplifier 404, the output value does not need to be inversely amplified by the variable vain amplifier 404. In such a case, the recording apparatus 1 determines whether the sensor detection amount identified in S810 exceeds the contamination detection threshold value in S811.

Further, in the above-described exemplary embodiment, contamination detection control processing is executed at the time of printing if a print job is received from the host apparatus 400. However, the exemplary embodiment is not limited thereto. For example, the contamination detection control processing may be executed when the recording apparatus 1 determines the execution of a reading operation of a document and a copying or printing operation of the read document. Further, the configuration may be such that calibration processing and sheet conveyance testing processing are executed at an initialization operation of the recording apparatus 1 after the power is input to the sheet detection sensor 20, and contamination detection control processing is executed based on the output value acquired in the sheet conveyance testing processing. In the above-described exemplary embodiment, sampling of the sensor detection amount is stopped during the period when conveyance of the recording medium is stopped. However, the exemplary embodiment is not limited thereto. For example, the configuration may be such that the sensor detection amount acquired during the period when conveyance of the recording medium is stopped is deleted before contamination detection processing of the reflection plate 23 is executed even though sampling of the sensor detection amount is continuously executed during the period when conveyance of the recording medium is stopped. Further, when contamination detection of the reflection plate 23 is to be executed, the sensor detection amount of the period when conveyance of the recording medium is stopped is not to be referred even though the sensor detection amount is continuously sampled and the above-described sensor detection amount is not deleted. In other words, in some embodiments contamination detection control processing only needs not to be executed based on the sensor detection amount acquired during the period when conveyance of the recording medium is stopped, but only needs to be executed based on the sensor detection amount of a period when conveyance of the recording medium is not stopped.

In the above-described exemplary embodiment, sampling of the sensor detection amount is stopped throughout the entire period when conveyance of the recording medium is stopped. However, the exemplary embodiment is not limited thereto. Among the sensor detection amounts acquired during the period when conveyance of the recording medium is stopped, a sensor detection amount acquired after a certain amount of time has passed since conveyance of the recording medium is stopped may cause an erroneous determination. In consideration of the above situation, sampling of the sensor detection amount may be stopped during a part of the period when conveyance of the recording medium is stopped. That is, in some embodiments the contamination detection control processing only needs not to be executed based on the sensor detection amount acquired during at least a part of the period when conveyance of the recording medium is stopped.

Some embodiments are not limited to the above-described embodiment, and many variations are possible within the scope of the present disclosure.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-187760, which was filed on Oct. 2, 2018 and which is hereby incorporated by reference herein in its entirety.

What is claimed is:

1. A detection apparatus including a conveyance portion configured to convey an object via a conveyance path and discharge the object to a discharge portion, a reflection portion configured to reflect light, a light emitting portion configured to emit light in a direction where the reflection portion is positioned, and a light receiving portion configured to receive light from outside including light reflected from the reflection portion, the detection apparatus comprising:
an acquisition unit configured to acquire an output value based on the light received by the light receiving portion;
a first detection unit configured to detect, based on the output value, the object conveyed and passing through at least a part of a path of light through which light emitted by the light emitting portion passes after the light emitted by the light emitting portion is reflected by the reflection portion until the reflected light is received by the light receiving portion; and
a second detection unit configured to detect lowering of a light reflectance of the reflection portion based on the output value output based on light received by the light receiving portion while the object is moving on a conveyance path, not based on at least a part of output values output based on light received by the receiving unit while the object is stopped on the conveyance path.

2. The detection apparatus according to claim 1, further comprising an execution unit configured to execute processing for recovering the lowered light reflectance of the reflection portion when the lowering of the light reflectance of the reflection portion is detected by the second detection unit.

3. The detection apparatus according to claim 2, wherein the processing for recovering the lowered light reflectance of the reflection portion includes at least one of notification processing for notifying a user regarding the reflection portion and cleaning processing for cleaning the reflection portion.

4. The detection apparatus according to claim 3,
wherein the processing for recovering the lowered light reflectance of the reflection portion includes the notification processing, and
wherein the notification processing includes processing for displaying a screen prompting a user to clean the reflection portion on a display unit.

5. The detection apparatus according to claim 1, further comprising a control unit configured to control a first output value that is output based on light received by the light receiving portion in a state where the object is not passing through the path of light when the light is emitted from the light emitting portion to be a specified value,
wherein the lowering of the light reflectance of the reflection portion is detected based on a second output value that is output based on the light received by the light receiving portion while the object is moving on the conveyance path when light is emitted from the light emitting portion, in a state where the first output value is controlled to be the specified value.

6. The detection apparatus according to claim 5, wherein at least one of processing for increasing an amount of light emitted from the light emitting portion and processing for increasing light sensitivity of the light receiving portion is executed so as to control the first output value to be the specified value.

7. The detection apparatus according to claim 5, wherein the object conveyed and passing through at least a part of the path is detected based on the second output value.

8. The detection apparatus according to claim 5, wherein the lowering of the light reflectance of the reflection portion is detected based on the second output value that has reached a predetermined threshold value.

9. The detection apparatus according to claim 8, wherein the object conveyed and passing through at least a part of the path is detected based on the second value that has reached a specified threshold value corresponding to a light amount greater than a light amount that the predetermined threshold value corresponds to.

10. The detection apparatus according to claim 1, wherein by stopping acquisition of the output value during at least a part of a period while the object is stopped on the conveyance path, the lowering of the light reflectance of the reflection portion is detected without depending on at least a part of output values output based on the light the light receiving portion receives while the object is stopped on the conveyance path.

11. The detection apparatus according to claim 1, wherein by not referring to at least a part of the output values acquired while the object is stopped on the conveyance path when lowering of the light reflectance of the reflection portion is detected, the lowering of the light reflectance of the reflection portion is detected without depending on at least a part of the output values output based on the light received by the light receiving portion while the object is stopped on the conveyance path.

12. The detection apparatus according to claim 1, wherein the object is a recording medium.

13. The detection apparatus according to claim 12, further comprising an image forming unit configured to form an image on the recording medium with a recording agent.

14. The detection apparatus according to claim 13, wherein the recording agent is ink.

15. The detection apparatus according to claim 13, wherein the recording medium is stopped on the conveyance path by execution of at least one of processing for fixing the recording agent applied to the recording medium, processing for suppressing generation a curl on the recording medium, and processing for inverting the recording medium for executing both side printing is executed.

16. A control method of a detection apparatus including a conveyance portion configured to convey an object via a conveyance path and discharge the object to a discharge portion, a reflection portion configured to reflect light, a light emitting portion configured to emit light in a direction where the reflection portion is positioned, and a light receiving portion configured to receive light from outside including light reflected from the reflection portion, the control method comprising:
   acquiring an output value based on light received by the light receiving portion;
   detecting, by a first detection, the object conveyed and passing through at least a part of a path of light through which light emitted by the light emitting portion passes after the light emitted by the light emitting portion is reflected by the reflection portion until the reflected light is received by the light receiving portion, based on the output value; and
   detecting, by a second detection, lowering of a light reflectance of the reflection portion based on the output value output based on light received by the light receiving portion while the object is moving on a conveyance path, without depending on at least a part of output values output based on light received by the receiving unit while the object is stopped on the conveyance path.

17. A non-transitory computer-readable storage medium storing a program that causes a computer of an detection apparatus including a conveyance portion configured to convey an object via a conveyance path and discharge the object to a discharge portion, a reflection portion configured to reflect light, a light emitting portion configured to emit light in a direction where the reflection portion is positioned, and a light receiving portion configured to receive light from outside including light reflected from the reflection portion to execute a method, the method comprising:
   acquiring an output value based on the light received by the light receiving portion;
   detecting, by a first detection, the object conveyed and passing through at least a part of a path of light through which light emitted by the light emitting portion passes after the light emitted by the light emitting portion is reflected by the reflection portion until the reflected light is received by the light receiving portion, based on the output value; and
   detecting, by a second detection, lowering of a light reflectance of the reflection portion based on the output value output based on light received by the light receiving portion while the object is moving on a conveyance path, not based on at least a part of output values output based on light received by the receiving unit while the object is stopped on the conveyance path.

* * * * *